(12) United States Patent
Böttcher et al.

(10) Patent No.: US 7,398,650 B2
(45) Date of Patent: Jul. 15, 2008

(54) INTERNAL COMBUSTION ENGINE COMPRISING A MECHANICAL CHARGER AND A TURBO-COMPOUND

(75) Inventors: Michael Böttcher, Stuttgart (DE); Christian Enderle, Aichwald (DE); Jochen Hufendiek, Stuttgart (DE); Klaus Wunderlich, Walblingen (DE)

(73) Assignee: Daimler AG, Stuttgart (DE)

( * ) Notice: Subject to any disclaimer, the term of this patent is extended or adjusted under 35 U.S.C. 154(b) by 107 days.

(21) Appl. No.: 11/441,418

(22) Filed: May 25, 2006

(65) Prior Publication Data

US 2006/0254565 A1    Nov. 16, 2006

Related U.S. Application Data

(63) Continuation-in-part of application No. PCT/EP2004/012404, filed on Mar. 11, 2004.

(30) Foreign Application Priority Data

Nov. 28, 2003   (DE)   ................... 103 55 563

(51) Int. Cl.
*F02G 3/00* (2006.01)
*F02G 5/04* (2006.01)
*F02B 33/00* (2006.01)
*F02B 37/00* (2006.01)
*F02B 37/10* (2006.01)

(52) U.S. Cl. ............... 60/624; 60/614; 60/659; 123/559.1; 123/559.3; 123/564

(58) Field of Classification Search .......... 60/624, 60/614, 607, 659; 123/559.1, 559.3, 564; F02B 37/00, F02B 37/02, 37/04, 37/10, 39/04, 33/36, F02B 41/10

See application file for complete search history.

(56) References Cited

U.S. PATENT DOCUMENTS

| | | | | | |
|---|---|---|---|---|---|
| 3,020,719 | A | * | 2/1962 | Seibold et al. | 60/358 |
| 3,289,747 | A | * | 12/1966 | Harris | 165/42 |
| 4,452,043 | A | | 6/1984 | Wallace | 60/624 |
| 4,628,692 | A | * | 12/1986 | Pierce | 60/659 |
| 4,926,642 | A | * | 5/1990 | Buthmann et al. | 60/607 |
| 5,138,840 | A | * | 8/1992 | Oguchi et al. | 60/624 |

FOREIGN PATENT DOCUMENTS

| | | |
|---|---|---|
| DE | 37 41 286 | 2/1996 |
| DE | 100 52 555 | 5/2002 |
| EP | 060159 A * | 9/1982 |

(Continued)

*Primary Examiner*—Thai-Ba Trieu
(74) *Attorney, Agent, or Firm*—Klaus J. Bach

(57) ABSTRACT

In an internal combustion engine comprising a mechanical charger in the form of a positive displacement compressor connected to the engine intake duct for supplying compressed air to the engine and a turbo-compound including an exhaust gas turbine connected to the engine exhaust duct for converting energy remaining in the exhaust gas to power, the exhaust gas turbine being connected to the engine via a reduction gear drive, the mechanical charger and the turbo-compound are coupled to the engine by a common belt drive including a first belt pulley mounted on the crankshaft of the engine, a second belt pulley mounted on the shaft of the reduction gear drive, and a third belt pulley mounted on the shaft of the mechanical charger.

9 Claims, 2 Drawing Sheets

FOREIGN PATENT DOCUMENTS

| | | |
|---|---|---|
| EP | 0 305 717 | 3/1989 |
| EP | 0 331 355 | 9/1989 |
| EP | 08 177507 | 7/1996 |
| EP | 10339156 | 12/1998 |
| JP | 58039510 A * | 3/1983 |
| JP | 63 055325 | 3/1988 |
| JP | 63248921 A * | 10/1988 |
| JP | 03117626 A * | 5/1991 |
| JP | 07 150963 | 6/1995 |
| JP | 2003020971 | 1/2003 |
| SU | 1714172 A1 * | 2/1992 |

* cited by examiner

INTERNAL COMBUSTION ENGINE COMPRISING A MECHANICAL CHARGER AND A TURBO-COMPOUND

This is a Continuation-In-Part Application of International Application PCT/EP2004/012404 filed Mar. 11, 2004 and claiming the priority of German Application 103 55 563.3 filed Nov. 28, 2003.

BACKGROUND OF THE INVENTION

The invention relates to an internal combustion engine comprising a mechanical charger and an exhaust gas turbine coupled to the engine for transmitting power thereto.

Internal combustion engines comprising a mechanical charger and a turbo-compound consisting of an exhaust gas turbine and a reduction gear have been known in the prior art for a long time. The mechanical charger is coupled to the internal combustion engine and compresses the air required for combustion. The turbo-compound utilizes the energy contained in the exhaust gas of the internal combustion engine by means of the exhaust gas turbine and transmits the power obtained from the exhaust gas to the internal combustion engine via a reduction gear.

Particularly positive displacement machines are used as mechanical chargers in internal combustion engines. Owing to the compact type of construction of, for example, a screw charger, the latter can easily be adapted to the internal combustion engine and is distinguished, inter alia, by a high pressure ratio at low rotational speeds, high part-load efficiencies and a characteristic pumping curve having a flat profile. The power consumed by the mechanical charger, which needs to be provided by the internal combustion engine, is a disadvantage however.

The power loss due to the mechanical charger can be compensated by the turbo-compound. By virtue of a suitable design, even at low to medium rotational speeds and/or load, the turbo-compound can output more power than the mechanical charger derives from the internal combustion engine.

The patent specification DE 37 41 286 C2 describes an internal combustion engine, the mechanical charger of which is connected to the internal combustion engine by means of a belt drive. An exhaust gas turbine is coupled to the mechanical charger by means of a gear.

The publication JP 63-055325 A describes an internal combustion engine with a mechanical charger which is coupled to the internal combustion engine via a first gear drive and an exhaust gas turbine which is coupled to the internal combustion engine via a second gear drive.

It is the object of the present invention to provide an internal combustion engine of the type referred to above, wherein, however, the mechanical charger and turbo-compound can be coupled to the internal combustion engine by a simple common means.

SUMMARY OF THE INVENTION

In an internal combustion engine comprising a mechanical charger in the form of a positive displacement compressor connected to the engine intake duct for supplying compressed air to the engine and a turbo-compound including an exhaust gas turbine connected to the engine exhaust duct for converting energy remaining in the exhaust gas to power, the exhaust gas turbine being connected to the engine via a reduction gear drive, the mechanical charger and the turbo-compound are coupled to the engine by a common belt drive including a first belt pulley mounted on the crankshaft of the engine, a second belt pulley mounted on the shaft of the reduction gear drive, and a third belt pulley mounted on the shaft of the mechanical charger.

The internal combustion engine is preferably designed in the cross flow type of construction, so that an inlet tract and, assigned to this, the mechanical charger are provided on one side of the internal combustion engine, and an outlet tract and, assigned to this, the turbo-compound are provided on the other side of the internal combustion engine. The turbo-compound has an exhaust gas turbine and a reduction gear coupled to the exhaust gas turbine. The mechanical charger and the turbo-compound each has a belt pulley which, together with the belt pulley of the crankshaft and a belt extending around the three belt pulleys, form a belt drive.

The internal combustion engine drives the mechanical charger via the belt drive. The mechanical charger compresses the air required for combustion and conveys the compressed air into the inlet tract of the internal combustion engine.

The exhaust gas turbine of the turbo-compound is coupled to the belt drive via the reduction gear. The belt drive and the reduction gear together form an overall transfer which assigns a rotational speed to the exhaust gas turbine as a function of the rotational speed of the internal combustion engine. The turbo-compound utilizes the energy contained in the exhaust gas of the internal combustion engine by means of the exhaust gas turbine and transmits the power obtained from the exhaust gas to the internal combustion engine via the reduction gear.

The coupling of the mechanical charger and of the turbo-compound to the internal combustion engine by means of a belt drive is particularly advantageous because a belt drive has a simple construction, can easily be mounted and requires no lubrication and scarcely any maintenance. Moreover, a belt drive allows more degrees of freedom as regards the arrangement of the components, since even relatively large center distances and multiple drives can be implemented simply and cost-effectively. Finally, low-noise operation and insensitivity to brief overloading are also advantages.

In a particular embodiment of the invention, the mechanical charger is disconnectable and connectable by a clutch and has a bypass comprising a bypass valve. Mechanical chargers are designed, as a rule, for full-load operation. As a result, in part-load ranges, excess air may be available which can be recirculated from a delivery side to a suction side of the mechanical charger via a bypass line. Moreover, it is advantageous to decouple the connectable mechanical charger from the internal combustion engine at operating points without charging and to cause the internal combustion engine to suck in combustion air via the bypass. The mechanical charger can thereby be adapted optimally to different operating points of the internal combustion engine whereby the engine operating efficiency can be improved.

In a further embodiment of the invention, the mechanical charger is designed in the form of a turbomachine. Advantageously, the turbomachine is designed as a mechanical centrifugal charger. The mechanical centrifugal charger has a rotational speed variator, a step-up gear and a compressor. The rotational speed variator is designed as a wrap-around drive (V-belt drive) and can be driven by the internal combustion engine. The rotational speed variator is connected to the step-up gear via a switchable clutch. The step-up gear is designed as a high-driver planetary gear drive. The step-up gear is connected to the compressor. Due to the use of the compressor, high charging efficiencies can be achieved as a consequence of the principle adopted.

By the compressor rotational speed being decoupled from the rotational speed of the internal combustion engine by means of the wrap-around drive and by raising the rotational speed level by means of the high-driver planetary drive, the compressor can be operated in optimum efficiency ranges even when rotational speeds of the internal combustion engine is changing.

In an advantageous embodiment of the invention, the reduction gear is designed in the form of a continuously variable transmission. The continuously variable transmission is provided for example as a wrap-around drive. Advantageously, the exhaust gas turbine in the turbo-compound is thereby decoupled from the rotational speed of the internal combustion engine, and the exhaust gas turbine can be operated in optimum efficiency ranges, even while the rotational speed of the internal combustion engine is changing.

In a further embodiment of the invention, the turbo-compound has an overrun clutch which permits the transmission of power from the turbo-compound to the internal combustion engine. The turbo-compound has an exhaust gas turbine and a reduction gear coupled to the exhaust gas turbine. As a function of the energy contained in the exhaust gas, the exhaust gas turbine consumes power or outputs power to the internal combustion engine via the reduction gear and the belt drive. The overrunning clutch makes it possible to decouple the turbo-compound from the internal combustion engine when the turbo-compound trails the internal combustion engine. Advantageously, the internal combustion engine does not output any power to the turbo-compound via the belt drive.

In a further embodiment of the invention, the turbo-compound has a hydraulic clutch. Advantageously, the use of the hydraulic clutch leads to a decoupling of the exhaust gas turbine from the rotational speed of the internal combustion engine.

The exhaust gas turbine can thus be operated in optimum efficiency ranges even in the case of changing rotational speeds of the internal combustion engine.

In a further embodiment of the invention, the exhaust gas turbine has a waste gate. The internal combustion engine has an exhaust system in addition to the mechanical charger and to the turbo-compound. The exhaust system is arranged downstream of the exhaust gas turbine of the turbo-compound. The exhaust system has, inter alia, a catalytic converter. The waste gate has a controllable bypass in a casing of the exhaust gas turbine. In the open position of the waste gate, the exhaust gas bypasses the exhaust gas turbine, so that the exhaust gas turbine is not driven by the exhaust gas of the internal combustion engine. By the exhaust gas turbine being bypassed, the exhaust gas back pressure falls and the efficiency of the internal combustion engine rises. Moreover, in the case of a cold start, the exhaust gas temperature can be held at a high level. This leads advantageously to a rapid heating of the catalytic converter. In a closed position of the waste gate, the exhaust gas flows through the exhaust gas turbine. The energy content of the exhaust gas thereby falls, thus leading to a lower exhaust gas temperature and reducing the pulsations of the exhaust gas. This advantageously gives rise to a careful treatment of the catalytic converter. Particularly in operating states of the internal combustion engine in which the turbo-compound cannot output any power to the internal combustion engine due to a lack of sufficient energy in the exhaust gas, a bypassing of the exhaust gas turbine is an advantage.

In a further embodiment of the invention, the belt drive drives a generator. By means of the belt drive, it is possible in a simple way to drive further components or assemblies of the internal combustion engine.

In another embodiment of the invention, the generator and the turbo-compound are coupled to one another via a second belt drive. The internal combustion engine drives the mechanical charger and the generator via the belt drive. The generator possesses a shaft, a belt pulley being provided at each of the ends of the shaft. A belt pulley is part of the belt drive of the internal combustion engine. The second belt pulley is part of the second belt drive which comprises a belt and a belt pulley of the turbo-compound. Advantageously, by the generator being interposed, it is possible to obtain further degrees of freedom with regard to the construction space. Moreover, owing to different diameters of the belt pulleys of the generator, a reduction in the rotational speed of the turbo-compound to the internal combustion engine can take place. It is thereby possible to provide the reduction gear with a lower reduction ratio.

The invention will become more readily apparent from the following description of two exemplary embodiments of the invention on the basis of the accompanying drawings:

DETAILED DESCRIPTION OF PREFERRED EMBODIMENTS

Figure 1:
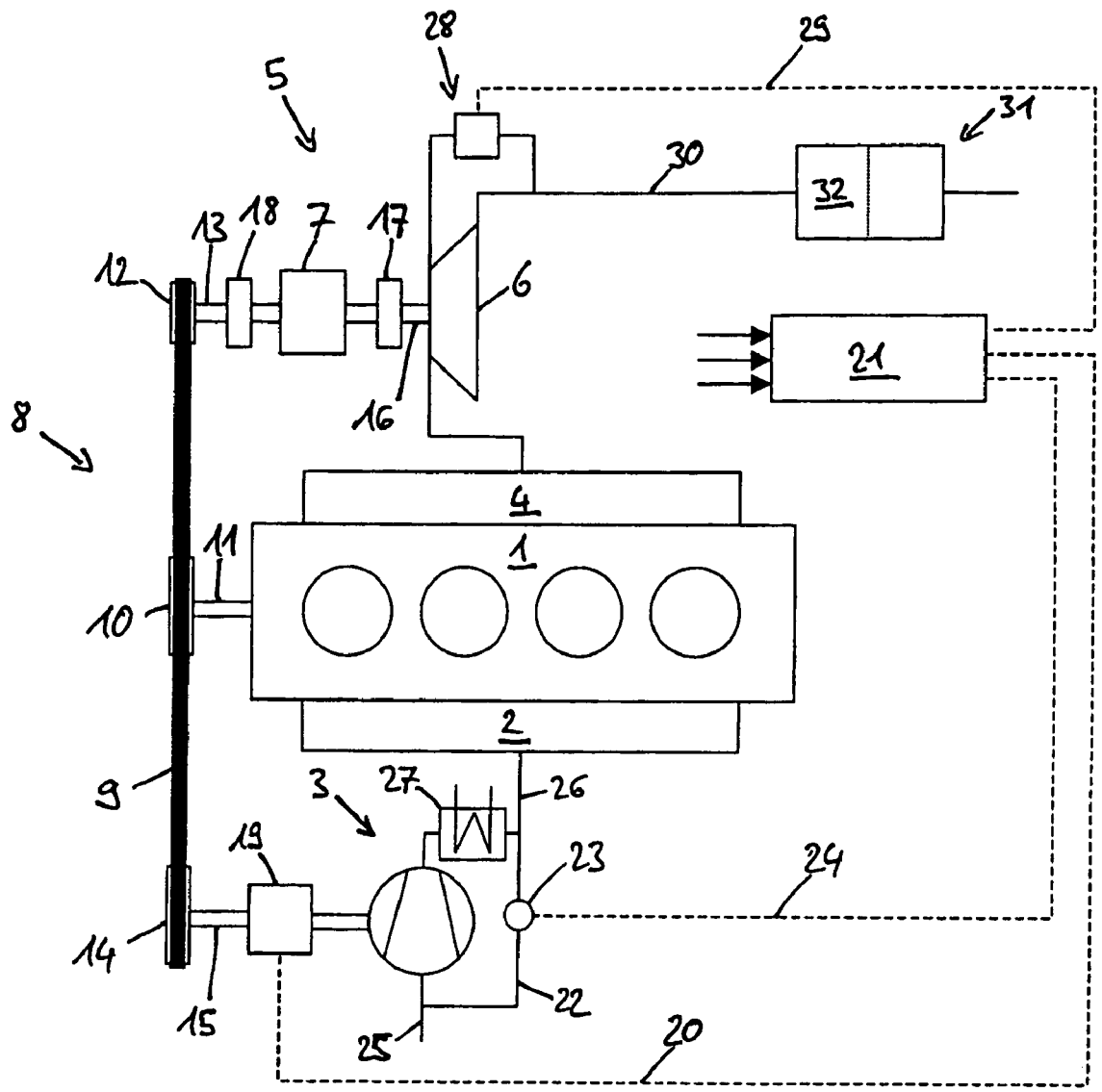
FIG. 1 shows diagrammatically a simplified first exemplary embodiment illustration of the internal combustion engine according to the invention.

FIG. 1 illustrates a first version of the internal combustion engine 1 according to the invention. The internal combustion engine 1 is preferably a spark ignition engine for passenger cars. However, use for diesel engines, in particular for commercial vehicles, may also be envisaged. The internal combustion engine 1 has an inlet tract 2 and, assigned to this, a mechanical charger 3 and an outlet tract 4 and, assigned to this, a turbo-compound 5. The turbo-compound 5 has an exhaust gas turbine 6 and a reduction gear 7 coupled to the exhaust gas turbine 6. The internal combustion engine 1, the mechanical charger 3 and the turbo-compound 5 are coupled to one another by means of a belt drive 8. The belt drive 8 includes a belt 9, with a belt pulley 10 on a crankshaft 11 of the internal combustion engine 1, a belt pulley 12 on an output shaft 13 of the reduction gear 7 and a belt wheel 14 on a drive shaft 15 of the mechanical charger 3.

The exhaust gas turbine 6 is coupled to the reduction gear 7 via an input shaft 16. The input shaft 16 leads to an overrunning clutch 17 and further on to the reduction gear 7. The overrunning clutch 17 permits only power transmission from the turbo-compound 5 to the internal combustion engine 1. The output shaft 13 leads from the reduction gear 7 to a hydraulic clutch 18 and further on to the belt wheel 12. Contrary to the illustration according to FIG. 1, the overrunning clutch 17, the reduction gear 7 and the hydraulic clutch 18 are preferably combined to form a unit. The reduction gear 7 is advantageously designed as a continuously variable gear, such as, for example, a wrap-around drive or rotational speed variator.

The drive shaft 15 of the mechanical charger 3 is connected to the mechanical charger 3 via a switchable coupling 19 in the form of an electromagnetic clutch. Contrary to the illustration according to FIG. 1, the electromagnetic clutch 19 is preferably integrated into the belt pulley 14 and can be activated by a control apparatus 21 via of a signal line 20. The mechanical charger 3 includes a bypass 22 comprising a bypass valve 23. The bypass valve 23 can be activated by the control apparatus 21 via of a signal line 24. The bypass 22 branches off from a suction line 25, upstream of the mechanical charger 3, and extends to a delivery line 26, downstream of the mechanical charger 3. The delivery line 26 connects the mechanical charger 3 to the inlet tract 2. The mechanical charger 3 conveys the air required for combustion from the suction line 25 via a charge air cooler 27 into the delivery line 26 and further on into the inlet tract 2. In the open position of the bypass valve 23, the mechanical charger 3 conveys at least part of the compressed air via the charge air cooler 27 into the bypass 22 and further on into the suction line 25.

The exhaust gas turbine 6 has a waste gate 28. In the open position of the waste gate 28, the exhaust gas is by-passed around the exhaust gas turbine 6. The waste gate 28 can be controlled by the control apparatus 21 via a signal line 29 by means of an electrical actuation device, not illustrated. The waste gate 28 is integrated in a casing of the exhaust gas turbine 6. An exhaust gas line 30 having an exhaust system 31 is provided downstream of the exhaust gas turbine 6. The exhaust system 31 has, inter alia, a catalytic converter 32 for the purification of the exhaust gases.

Figure 2:
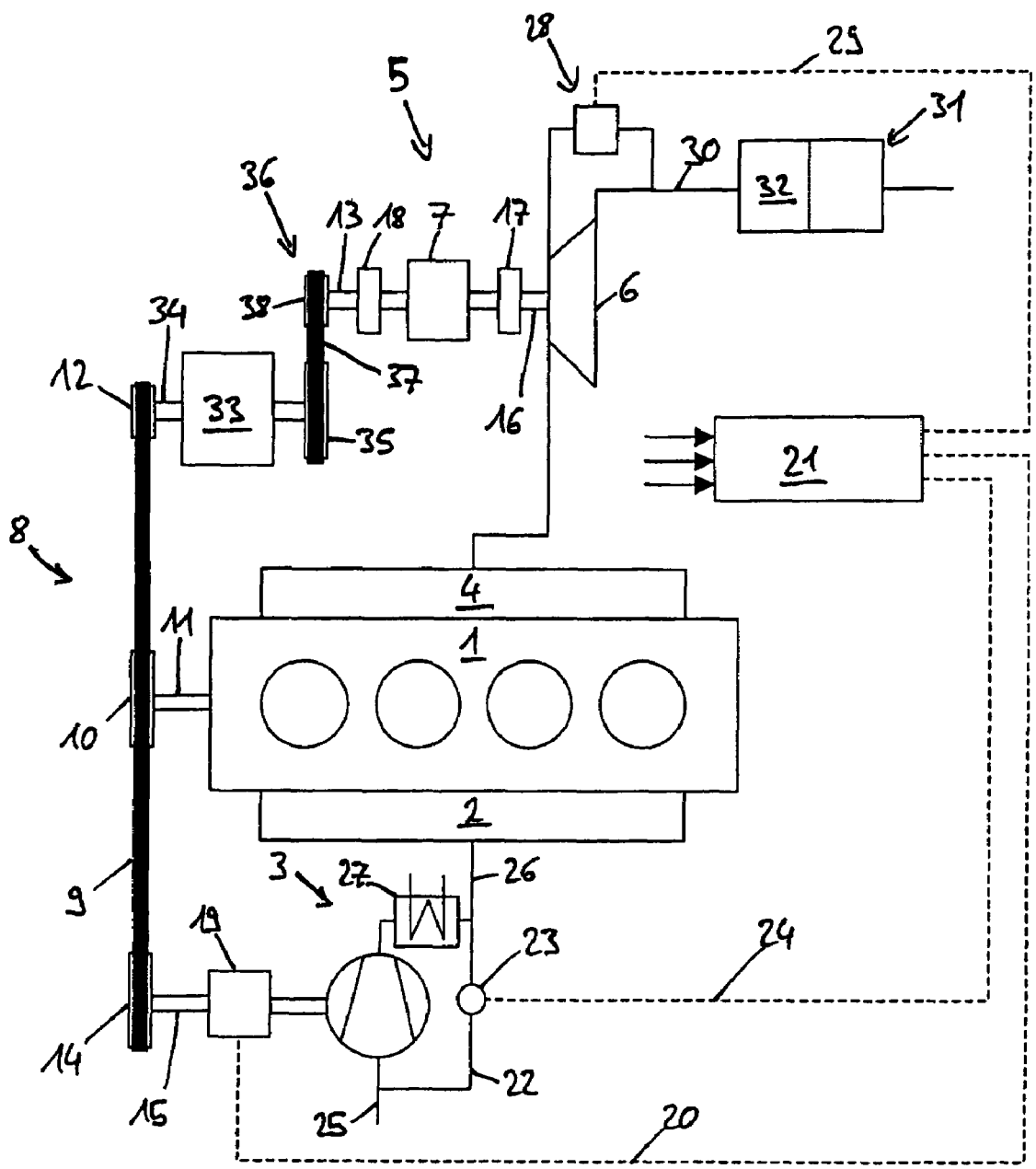
FIG. 2 shows diagrammatically a simplified second exemplary embodiment of the internal combustion engine according to the invention.

FIG. 2 illustrates a second embodiment of the internal combustion engine 1 according to the invention, in which all identical or identically operating components have been identified by the same reference symbols as used in connection with the first exemplary embodiment. The only change in respect of the first exemplary embodiment is that an electric generator 33 is additionally connected between the belt drive 8 and the turbo-compound 5. The generator 33 has a driveshaft 34, on which the belt pulley 12 of the belt drive 8 and, at the other end of the driveshaft 34, a belt wheel 35 are provided. The belt pulley 35 is part of a second belt drive 36 which couples the generator 33 and the turbo-compound 5 to one another. The belt drive 36 has, in addition to the belt pulley 35, a second belt 37 and a belt pulley 38. The belt pulley 38 is provided on the output shaft 13 of the reduction gear 7.

The internal combustion engine 1 drives the mechanical charger 3 and the turbo-compound 5 via the belt drive 8. The control apparatus 21 receives the signals required for detecting the operation and controlling the operation of the internal combustion engine 1, such as, for example, the rotational speed of the internal combustion engine, the exhaust gas temperature and the accelerator pedal position. The control apparatus 21 processes the incoming signals and controls the internal combustion engine 1 comprising the mechanical charger 3 and the turbo-compound 5 in a way known per se.

By the mechanical charger 3 and the turbo-compound 5 being coupled to the internal combustion engine 1 by means of a belt drive 8, the advantages of the mechanical charger 3 and of the turbo-compound 5 can optimally be combined with one another. The mechanical charger 3 makes it possible to implement a spontaneous response behavior of the internal combustion engine 1. The turbo-compound 5 utilizes the specific energy contained in the exhaust gas and supplies this energy directly to the internal combustion engine 1 as mechanical energy.

In a further design, not illustrated, of the internal combustion engine 1 according to the invention, the mechanical charger 3 can be utilized as a secondary air pump. In this case, the mechanical charger 3 supplies at least part of the compressed air required for combustion to the exhaust system 29.

In a further design, not illustrated, of the internal combustion engine 1 according to the invention, in the closed position of the waste gate 28, the increased exhaust gas back pressure can be utilized for exhaust gas recirculation. In this case, at least part of the exhaust gas flows, upstream of the exhaust gas turbine 6, into the inlet tract 2.

What is claimed is:

1. An internal combustion engine (1) comprising a mechanical charger (3) and a turbo-compound (5), the mechanical charger (3) being a positive displacement machine being coupled to the internal combustion engine (1) and the turbo-compound (5) comprising an exhaust gas turbine (6) and a reduction gear drive (7) coupled to the exhaust gas turbine (6), the coupling of the mechanical charger (3) and of the turbo-compound (5) to the internal combustion engine (1) being provided by a common belt drive (8), which is formed by a belt (9) with a first belt pulley (10) mounted on a crankshaft (11) of the internal combustion engine (1), by a second belt pulley (12) mounted on an output shaft (13) of the reduction gear drive (7) and by a third belt pulley (14) mounted on a driveshaft (15) of the mechanical charger (3).

2. The internal combustion engine as claimed in claim 1, wherein the mechanical charger (3) is selectively activatable and has a bypass (22) comprising a bypass valve (23).

3. The internal combustion engine as claimed in claim 1, wherein the mechanical charger (3) is in the form of a turbomachine.

4. The internal combustion engine as claimed in claim 1, wherein the reduction gear (7) is a continuously variable transmission.

5. The internal combustion engine as claimed in claim 1, wherein the turbo-compound (5) includes an overrunning clutch (17) which permits power transmission from the turbo-compound (5) to the internal combustion engine (1).

6. The internal combustion engine as claimed in claim 1, wherein the turbo-compound (5) includes a hydraulic clutch (18).

7. The internal combustion engine as claimed in claim 1, wherein the exhaust gas turbine (6) has a waste gate (28) with a by-pass line by-passing the turbine (6).

8. The internal combustion engine as claimed in claim 1 wherein the belt drive (8) is connected to an electric generator (33).

9. The internal combustion engine as claimed in claim 8, wherein the electric generator (33) and the turbo-compound (5) are coupled to one another via a second belt drive (36).

* * * * *